Sept. 27, 1949.  B. G. JONES  2,483,205

INTERMITTENT BRAKE

Filed Aug. 13, 1945

INVENTOR.
BONNIE G. JONES.

BY
H. C. Karel
ATTORNEY.

Patented Sept. 27, 1949

2,483,205

UNITED STATES PATENT OFFICE 2,483,205

INTERMITTENT BRAKE

Bonnie G. Jones, near Williamsburg, Ky.

Application August 13, 1945, Serial No. 610,411

1 Claim. (Cl. 188—152)

This invention relates to a new and improved auxiliary unit to be used in connection with a conventional hydraulic braking system to create rapid intermittent pressure pulsations in the hydraulic fluid to intermittently intensify the braking action. I have found that I can secure better braking traction on slippery or wet pavements by intermittently increasing and decreasing the brake application.

The object of my invention is to provide means to cause the brake action to be intermittent.

A further object of my invention is to provide in connection with a hydraulic brake system for motor propelled vehicles an auxiliary unit for intermittently increasing the pressure on the brakes.

A further object is to provide means to disengage said auxiliary unit from the braking system.

A still further object is to provide means to adjust the degree of intermittent braking action.

A still further object is to provide automatic means to produce the intermittent action of the brakes.

My invention will be further readily understood from the following description and claim and from the drawings, in which latter:

Figure 1:
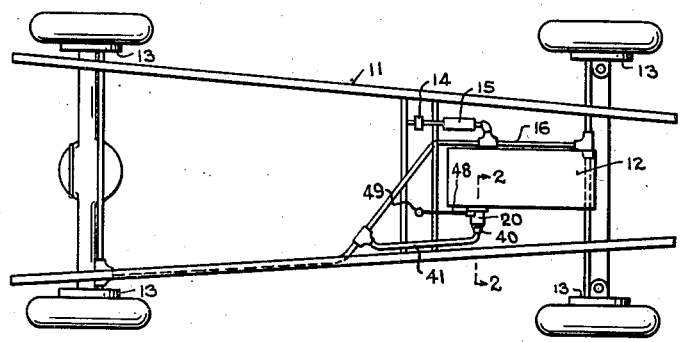
Fig. 1 is a plan view of a motor propelled vehicle with the body removed.
Figures 2, 3:
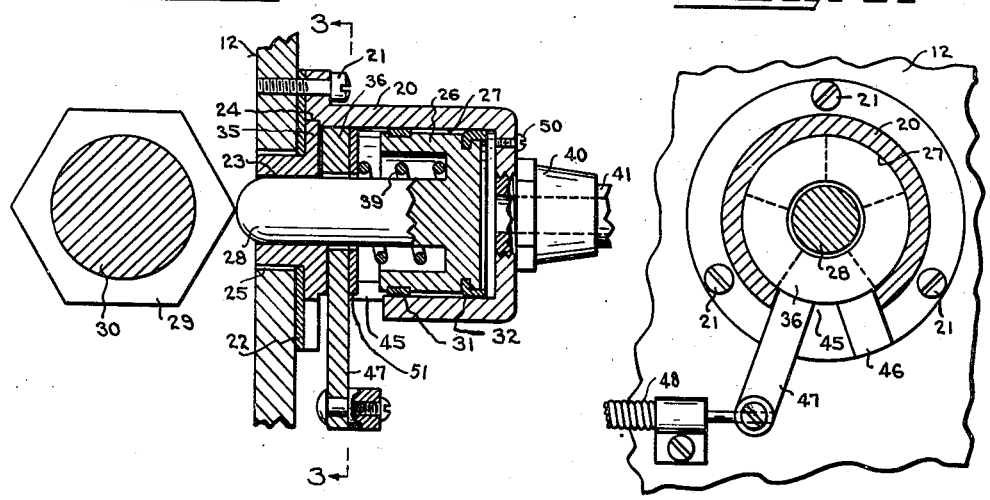
Fig. 2 is a vertical cross-section of my improved mechanism, taken in the plane of the line 2—2 of Fig. 1.
Fig. 3 is a vertical transverse section of the same, taken in the plane of the line 3—3 of Fig. 2.
Figures 4, 5, 6, 7:
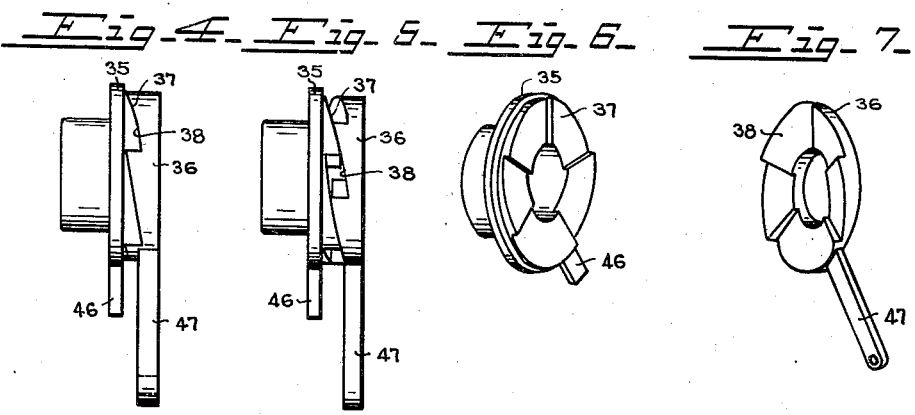
Fig. 4 is a side view of the two adjusting members.
Fig. 5 is a similar view showing the members in adjusted position.
Fig. 6 is a perspective view of one of the adjusting members.
Fig. 7 is a perspective view of the other adjusting member.

I have shown my improvement applied to a motor propelled vehicle 11 having an internal combustion engine 12 and hydraulic brakes 13. The brakes are controlled by a foot operating pedal 14 operating a cylinder 15 for creating pressure in the brake mechanism through tubular connections 16. The structure just described may be any conventional hydraulic braking system now in general use and my improved mechanism is arranged to be connected to said conventional system for intermittently boosting the pressure in the system beyond the pressure controlled by the foot brake pedal.

Secured to the side of the motor 12 is a housing 20, secured thereto as by screws 21, having a suitable gasket 22 interposed between the housing 20 and the motor 12. A bearing 23 is secured in the end of the housing 20 being received in an annular rabbet 24 and extending through an aperture 25 in the side wall of the motor. A piston 26 is movable endwise in a cylinder 27 in the housing 20. The piston has an extending shank 28 extending through the bearing 23 and contacting a cam 29 secured to the camshaft 30 of the motor. The piston 26 is provided with suitable sealing rings 31 and 32.

Received within the housing 20 between the bearing 23 and the piston are a pair of cooperating members 35 and 36 provided with cooperating cam faces 37 and 38. The member 35 is integral with the bearing 23. A spring 39 is interposed between the member 36 and the piston for normally urging the members 35 and 36 into engagement and maintaining the piston in its outward position. Secured to the head of the cylinder 27 is a connection 40 arranged to couple a tubular connection 41 to the usual hydraulic line 16. The housing 20 is provided with an opening 45 through which arms 46 and 47 of the members 35 and 36 extend. A flexible shaft 48 is suitably connected to the member 47 having a handle 49 on the other end thereof suitably arranged within the driving compartment of the vehicle for controlling the position of the arm 47 and moving the cam face 38 in respect to the cam face 37 for limiting the inward movement of the piston 26. Thus the cam faces can be so adjusted to withhold the shank 28 of the piston 26 away from the cam 29 whereby the device will be inoperative or by adjusting the relation of the cams in respect to each other the degree of increased intermittent pressure applied to the braking system can be controlled. The cam 35 can be adjusted by moving the arm 46 in the slot 45 to increase or decrease the relative action of the cams. This cam 35 which is integral with the bearing 23 is snugly held in the rabbet 24 and when adjusted remains in adjusted position. A sound insulating washer 51 between the member 36 and the spring 39 arrests the piston 26 during limited strokes of the piston. A screw 50 threaded into the head of the cylinder provides means for bleeding the cylinder through the threaded hole when the screw is removed. Under normal driving conditions with dry pavements the lever 27 would be moved to a position whereby the shank 28 would be held out of engagement with the cam 29 for normal application of the brakes. When it is desired to obtain a gripping traction between the tires and the roadbed particularly when the pavement is wet or slippery the knob 49 can be manipulated whereby the shank 28 will contact the cam 29 and as pressure is applied to the brakes said fluid under pressure will fill the space in the cylinder above the piston and as the cam 29 rotates the piston will reciprocate back and forth for injecting an added pressure into the fluid system for intermittently creating intensified pulsations in the fluid system of the braking system for causing the wheels of the vehicle to intermittently create a greater traction force on the pavement.

During the time the brakes are not depressed, the spring 39 retains the piston in its outward position, whereby the shank 28 is free of the cam 29.

While I have shown and described the cam 29 mounted on the camshaft 30, it will be apparent that the cam 29 may be mounted on any of the several rotating shafts on the vehicle.

Having thus fully described my invention, what I claim as new and desire to secure by Letters Patent, is:

A motor vehicle provided with hydraulic brakes, a fluid control system for operating said brakes, an auxiliary cylinder communicating with said fluid control system, a piston in said cylinder, means for oscillating said piston, resilient means for urging said piston to disengage said oscillating means, mechanism comprising an inclined plane adapted to positively retain said piston from engaging said oscillating means, said mechanism adjustable to permit a variation of oscillation of said piston, said piston being adapted to automatically engage said oscillating means in response to a predetermined pressure on said fluid except when positively retained therefrom, and manual control means operatively connected to said mechanism for selectively engaging, disengaging or limiting the oscillation of said piston.

BONNIE G. JONES.

REFERENCES CITED

The following references are of record in the file of this patent:

UNITED STATES PATENTS

| Number | Name | Date |
| --- | --- | --- |
| 2,270,585 | Gartner | Jan. 20, 1942 |
| 2,270,586 | Jahant et al. | Jan. 20, 1942 |

FOREIGN PATENTS

| Number | Country | Date |
| --- | --- | --- |
| 493,697 | Great Britain | Oct. 10, 1938 |